(12) United States Patent
Feldstein

(10) Patent No.: US 8,181,747 B2
(45) Date of Patent: May 22, 2012

(54) BICYCLE CHAIN CLEANER AND LUBRICATION APPARATUS

(75) Inventor: George Feldstein, Cresskill, NJ (US)

(73) Assignee: Crestron Electronics Inc., Rockleigh, NJ (US)

( * ) Notice: Subject to any disclaimer, the term of this patent is extended or adjusted under 35 U.S.C. 154(b) by 825 days.

(21) Appl. No.: 12/260,166

(22) Filed: Oct. 29, 2008

(65) Prior Publication Data

US 2010/0101607 A1    Apr. 29, 2010

(51) Int. Cl.
*B08B 3/10* (2006.01)
*B08B 13/00* (2006.01)
*F16N 7/14* (2006.01)

(52) U.S. Cl. .................. 184/15.1; 134/15; 134/95.1

(58) Field of Classification Search .............. 184/15.1, 184/15.2, 15.3; 134/9, 15, 95.1; 118/400; 83/169
See application file for complete search history.

(56) References Cited

U.S. PATENT DOCUMENTS

| | | | |
|---|---|---|---|
| 4,333,840 A | 6/1982 | Reick | |
| 4,578,120 A * | 3/1986 | Chiarella | 134/9 |
| 4,593,923 A | 6/1986 | Thalmann | |
| 4,648,486 A * | 3/1987 | Kayser et al. | 184/15.1 |
| 4,783,186 A | 11/1988 | Manning | |
| 5,069,470 A | 12/1991 | Spencer | |
| 5,213,180 A | 5/1993 | Masonek | |
| 5,484,038 A * | 1/1996 | Rowell | 184/15.1 |
| 6,244,388 B1 * | 6/2001 | Yun | 184/63 |
| 6,257,369 B1 | 7/2001 | Pesl | |
| 6,942,409 B2 | 9/2005 | Barbieri | |

* cited by examiner

*Primary Examiner* — William A Rivera
*Assistant Examiner* — Robert Reese
(74) *Attorney, Agent, or Firm* — Crestron Electronics Inc.

(57) ABSTRACT

A bicycle sprocket chain cleaning and lubrication apparatus allows a sprocket chain (3) to be cleaned while still mounted on the bicycle. The apparatus includes a includes a housing (10) for enclosing the sprocket chain on all sides consisting of mutually connectable upper half-shell (11) and lower half-shell (12) portions and a securement assembly which includes a mounting plate adapted to attach to a rear wheel quick disconnect of the bicycle. The housing is suspended from the sprocket chain and provides a funnel shaped solvent hopper (17), a hose connection (21) to a compressed air supply, and an air knife (23) adapted to direct high velocity air to impinge upon and thereby dry the sprocket chain.

13 Claims, 2 Drawing Sheets

BICYCLE CHAIN CLEANER AND LUBRICATION APPARATUS

BACKGROUND OF THE INVENTION

1. Technical Field

This invention relates generally to devices for cleaning and lubricating the sprocket chain of a chain drive mechanism, and more particularly to a device that uses compressed air both to clean the chain and then to apply a thin coating of lubricant.

2. Background Art

The present invention is useful for cleaning and lubricating, in situ, the sprocket chain of a chain drive mechanism of the type found, for example, in motorcycles and bicycles. For convenience, the invention will be described in the context of a bicycle chain drive.

In a bicycle, the chain drive is constituted by a continuous sprocket chain loop whose links at one end of the loop engage a sprocket associated with the pedals of the bicycle and at the other end engage a sprocket associated with the rear wheel. The arrangement is such that when the pedals are operated to rotate the associated sprocket in the clockwise direction, this acts to advance the sprocket chain loop in the same direction and to drive the rear wheel; but when the pedals are operated to rotate the sprocket counterclockwise, the loop is advanced in the reverse direction and the rear wheel is then disengaged from its associated sprocket. Hence when an assembly in accordance with the invention is used to treat the sprocket chain on a bicycle, one then advances the sprocket chain loop in the reverse direction so that the rear wheel is not driven thereby.

The effort a rider must exert to operate a bicycle depends in good part on effective lubrication. If the wheel bearings and the chain drive are inadequately lubricated, the resultant friction not only makes it more difficult for the rider to pedal the bicycle, but it also results in wear and possible overheating of the sliding metal components, giving rise to destructive metal fatigue. And since the sprocket chain which is exposed has a greasy surface, in the course of operation it tends to pick up grit and dirt particles which adhere to the chain and introduce friction.

Conscientious bicycle owners are aware of the need to maintain the sprocket chain in a clean and well lubricated condition; but with existing expedients for this purpose it is difficult to do so. Thus, before applying a lubricant to the chain, the usual practice is to wipe it clean with a rag to remove the grime therefrom. But since the chain loop is composed of a continuous series of links that are pivotally interconnected, it is difficult with a rag to thoroughly clean the chain. It is even more difficult with a conventional oil can having a nozzle to apply lubricant to the entire chain so that all of its links and their pivot pins are properly lubricated.

The prior art recognizes this problem and discloses various expedients with a view to solving the problem. Thalmann (U.S. Pat. No. 4,593,923) discloses a reservoir which is so attached to the bicycle that as the sprocket chain advances, it passes through the reservoir which contains a solvent as well as brushes to clean the chain. Chiarelli (U.S. Pat. No. 4,578,120) provides a sprocket chain cleaner in which the reservoir is provided with rotary brushes which are turned by the sprocket chain, the reservoir containing either a solvent or a lubricant. The practical drawback to the Thalmann and Chiarelli schemes is that they both use brushes to clean the chain and they both allow the chain being cleaned to emerge wet, thereby allowing dirty solvent to drip on surfaces near the bicycle.

Manning (U.S. Pat. No. 4,783,186) describes a sprocket chain cleaner that uses twin brushes formed by strong flexible bristles, such as nylon bristles, capable of forcefully scrubbing the advancing sprocket chain.

Masonek (U.S. Pat. No. 5,213,180) is a lubricant applicator for a drive chain having a housing with interior flexible plastic bristles.

Pesl (U.S. Pat. No. 6,257,369) describes an apparatus for cleaning and lubricating drive chains, in particular motorcycle drive chains, that includes brushes which are attached in the housing to wipe off the drive chain.

Barbieri (U.S. Pat. No. 6,942,409) describes a bicycle chain cleaner fitted on a spray can of cleaning and lubricating solution that also includes brushes with tufts of radial bristles adapted to penetrate between links of the chain.

There is a long-felt need for an effective chain cleaning and lubrication device that does not rely on brushes and also dries the chain thoroughly.

SUMMARY OF THE INVENTION

It is to be understood that both the general and detailed descriptions that follow are exemplary and explanatory only and are not restrictive of the invention.

DISCLOSURE OF INVENTION

In view of the foregoing, the main object of this invention is to provide a chain cleaning and lubricating device for, in situ, the sprocket chain of a chain drive mechanism.

Significant features of this invention are the lack of scrubbing brushes and the innovative use of compressed air to immediately dry the chain before it exits the cleaning canister and force cleaner under pressure from the airflow to remove dirt and grease.

A first object of the present invention is to provide a chain cleaner and lubrication apparatus for cleaning a sprocket chain where the sprocket chain remains operationally mounted on a vehicle. This apparatus includes a housing, rollers mounted within the housing to suspend the housing from the sprocket chain, and an air knife that directs high velocity air to impinge upon the sprocket chain. The housing encloses the sprocket chain on all sides. The housing consists of mutually connectable upper half-shell and lower half-shell portions which, when connected, define a chain passageway for allowing the sprocket chain to pass through. The upper half-shell portion includes a funnel shaped solvent hopper having a drainage opening adjacent the sprocket chain and the lower half-shell portion includes a fluid collection region.

A second object of the present invention is to provide a bicycle chain cleaner for cleaning a sprocket chain while the sprocket chain remains operationally mounted on a bicycle. This bicycle chain cleaner includes a housing for enclosing the sprocket chain on all sides with a chain passageway passing therethrough and a securement assembly restraining the housing from moving in response to chain motion. The housing consists of mutually connectable upper half-shell and lower half-shell portions which are secured to one another using rubber bands. The chain passageway has a rectangular cross section which substantially matches the cross section of the sprocket chain. The securement assembly includes a mounting plate attached to a rear wheel quick disconnect of the bicycle and a cable. The lower half-shell includes a fluid collection region. The upper half-shell includes rollers that suspend the housing from the sprocket chain, a funnel shaped solvent hopper having a drainage opening adjacent the sprocket chain, a cover adapted to fit on the funnel shaped solvent hopper and cover the same, a tubular hose connection for allowing connection of a hose from a compressed air supply, an air knife adapted to direct high velocity air to impinge upon the sprocket chain, a siphon tube fluidly connected from the fluid collection region to the funnel-shaped hopper region, a venturi adapted to accept high velocity air and to thereby produce a vacuum within the siphon tube, and an air tube communicating with said tubular hose connection and connected to the air knife and the venturi.

A third object of the present invention is to provide a method for cleaning a sprocket chain on a bicycle having a frame without removing the sprocket chain from the bicycle. This method includes the steps of: placing a upper portion of a cleaning canister on the sprocket chain, engaging a lower portion of the cleaning canister to the upper portion of the cleaning canister, securing the upper portion and said lower portions of the cleaning canister to one another, securing the cleaning canister to the bicycle frame, and moving the sprocket chain through the cleaning canister while sequentially coating the sprocket chain with solvent as it passes beneath a solvent hopper and drying the sprocket chain with high velocity air as it passes beneath at least one air knife. The upper portion of the cleaning canister includes internal rollers to engage the sprocket chain which thereby supports the upper portion of the cleaning canister. The engagement of the lower portion of the cleaning canister to the upper portion of the cleaning canister forms the complete cleaning canister which includes a notched portion to allow the sprocket chain to pass through. The solvent hopper allows solvent access to the sprocket chain.

Finally, a fourth object of the present invention is to provide a method for lubricating a sprocket chain on a bicycle having a frame without removing the sprocket chain from the bicycle. This method includes the steps of: placing a upper half-shell on the sprocket chain, engaging a lower half-shell to the upper shell where this combined engagement forms the complete canister, securing the upper half-shell to the lower half-shell, securing the canister to the bicycle frame, and moving the sprocket chain through the canister while sequentially applying lubricant to the sprocket chain and drying said sprocket with high velocity air. The upper half-shell includes internal rollers to engage the sprocket chain in order to support the upper half-shell. The complete canister includes a notched portion to allow the sprocket chain to pass through the canister, an open portion to allow external access to the sprocket chain, and at least one air knife that aims high velocity air to impinge upon the sprocket chain as it passes beneath.

The present invention seeks to overcome or at least ameliorate one or more of several problems, including cleaning and lubricating bicycle chains without dripping solvent or having to afterward clean brushes within a cleaning device.

BRIEF DESCRIPTION OF DRAWINGS

The accompanying figures further illustrate the present invention.

BRIEF DESCRIPTION OF THE SEVERAL VIEWS OF THE DRAWING

Figure 1:
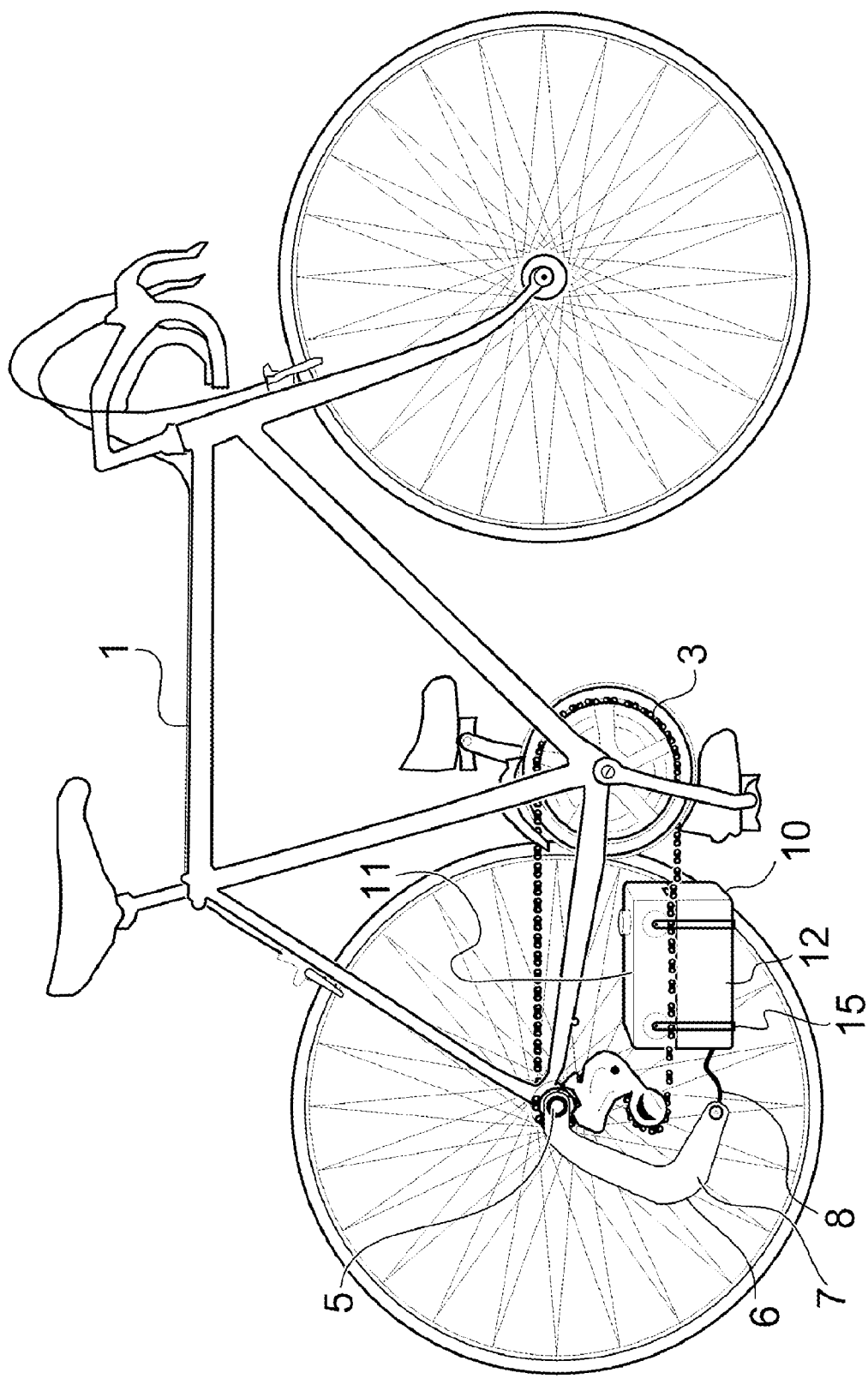

FIG. 1 illustrates a typical bicycle and shows a potential location for the chain cleaner and lubrication device of the present invention.

Figure 2:
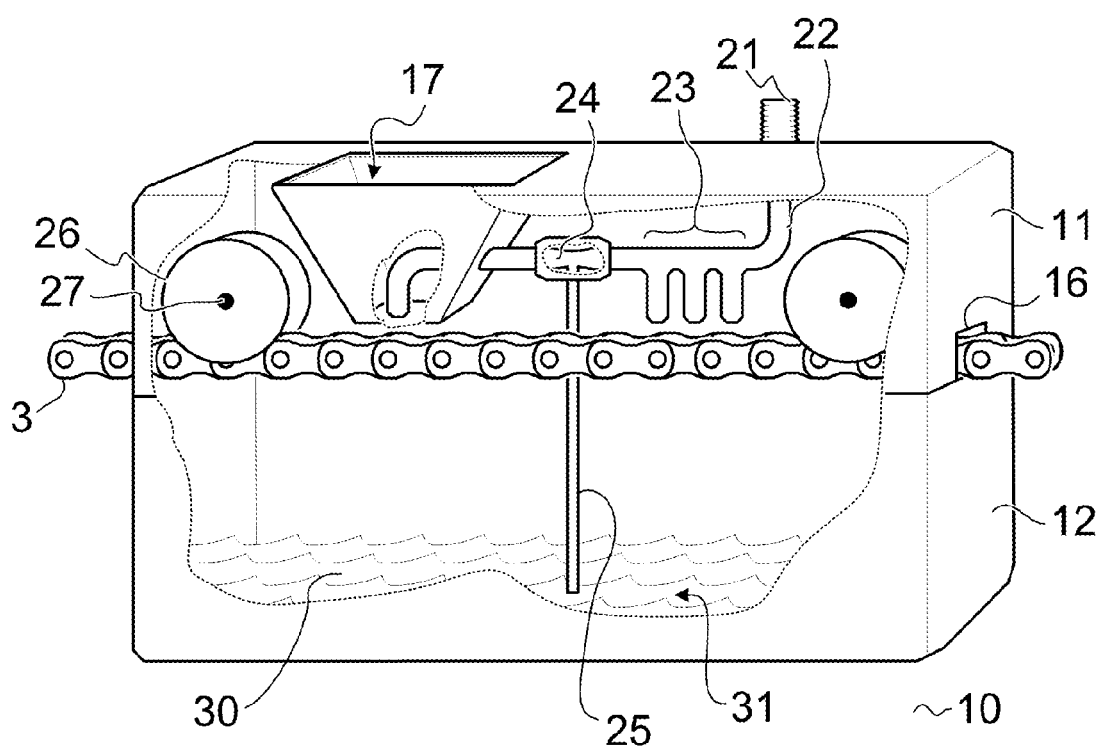

FIG. 2 depicts certain internal features of the chain cleaner and lubrication device of FIG. 1.

LIST OF REFERENCE NUMBERS FOR THE MAJOR ELEMENTS IN THE DRAWING

The following is a list of the major elements in the drawings in numerical order.
1 bicycle
3 sprocket chain
5 quick disconnect
6 securement assembly
7 bracket (p/o securement assembly 6)
8 restraining cable (p/o securement assembly 6)
10 housing (cleaning canister)
11 upper half-shell (portion of housing 10)
12 lower half-shell (portion of housing 10)
15 rubber bands
16 chain passageway (through housing 10)
17 funnel shaped solvent hopper (part of upper half-shell 11)
21 air fitting
22 air pipe
23 air knife(s)
24 venturi (provides vacuum for siphon tube 25)
25 siphon tube
26 rollers
27 axle (of roller 26)
30 fluid collection region
31 solvent

DETAILED DESCRIPTION OF THE INVENTION

The present invention is a bicycle chain cleaner that uses compressed air.

Mode(s) for Carrying Out the Invention

The preferred embodiment of the present invention is described herein in the context of a sprocket chain mounted on a multi-speed bicycle, but is not limited thereto, except as may be set forth expressly in the appended claims.

Refer first to FIG. 1, which shows a typical road bicycle 1 that includes a sprocket chain 3 and a rear wheel having a quick disconnect 5. Shown attached to the quick disconnect 5 is a securement assembly 6 which is designed to restrain the cleaning canister 10 form moving when the sprocket chain is moved. The securement assembly 6 consists of a mounting plate 7 which is directly attached to the rear wheel disconnect 5 and a cable 8 which is attached to the cleaning canister housing 10. More specifically, the restraining cable 8 is connected between the bracket 6 and the cleaning canister 10 and acts to restrain the cleaning canister 10 from moving in a lateral direction when the sprocket chain 3 is pulled therethrough.

The cleaning canister housing 10 is shown suspended from the sprocket chain 3. The housing 10 is formed from a combination of a mutually connectable upper half-shell 11 and lower half-shell 12, which when connected, enclose the sprocket chain on all sides but includes a chain passageway 16 for allowing the sprocket chain to pass through. In a preferred embodiment, the upper half-shell and lower half-shell portions are secured to one another using rubber bands 15.

FIG. 2 illustrates additional details of the cleaning canister housing 10. As shown, the chain passageway 16 has a rectangular cross section which substantially matches the cross section of the sprocket chain 3.

Two rollers 26, such as rollers fabricated from plastic are used to suspend the cleaning canister housing 10 from the sprocket chain as shown in both FIGS. 1 and 2. Suitable plastic types include, but are not limited to, acetal resin, nylon, polyethylene, perfluoroalkoxy, polyvinylidene fluoride and polypropylene. The rollers 26 are mounted on axles 27, such as stainless steel rods, that are in turn supported by the upper half-shell portion 11 of the cleaning canister 10. Advantageously, axles 27 can be allowed to slightly protrude from the sides of the cleaning canister 10 and thereby be used to secure rubber bands 15, as shown in FIG. 1.

The upper shell 11 includes a tubular hose connection 21 that is provided for connection to a compressed air source, such as an air compressor that might be found in a typical home workshop. The tubular hose connection 21 is internally connected to an air tube 22 which is further connected to one or more air knifes 23. In preferred embodiments, the air tube 22 is yet further connected to a venturi 24 which provides a vacuum suction force to siphon tube 25.

The sprocket chain 3 is pulled through the chain passageway 16 of cleaning canister 10 and thereby passes beneath funnel shaped solvent hopper 17 and the air knifes 23. The funnel shaped solvent hopper 17 has a drainage opening that is adjacent to the sprocket chain 3. After solvent 31 passes through this drainage opening, it is captured in a collection region 30, which is part of the lower half-shell 12.

After the sprocket chain is pulled past the funnel shaped solvent hopper 17, it then passes beneath air knifes 23 which are configured to direct high velocity air to impinge upon the sprocket chain 3. Certain embodiments of the present invention include a single air knife 23, while other embodiments include multiple air knifes 23.

During operation, the solvent 31 is introduced to, and wets, the sprocket chain 3 as it passes beneath the funnel shaped solvent hopper 17. Those skilled in the art will recognize that this is readily accomplished by pouring solvent into an open end of funnel shaped solvent hopper 17. In a preferred embodiment, after a certain amount of solvent 31 is so introduced, a cover adapted to fit on the solvent hoper is closed and the vacuum in siphon tube 25 causes the solvent 31 captured in collection region 30 to rise up through the siphon tube 25 entering the airstream and back into the funnel-shaped solvent hopper 17, and then reflowing onto the sprocket chain 3.

As the sprocket chain 3 passes beneath the air knifes 23, any excess solvent that is still on the chain is blown off, and the chain exits dry from the notched portion 16. Those skilled in the art will appreciate that a dry chain will not drip solvent on either the ground or other objects near where the chain is being cleaned. A first embodiment of the present invention uses one air knife 23, but the invention contemplates different embodiments that have multiple air knifes 23.

In addition to using the air knifes 23 to dry solvent 30 from the sprocket chain 3, the inventor has discovered that these air knifes are useful in the task of lubricating chains.

It is known to those skilled in the art that a very thin coating of a high viscosity lubrication, such as lithium grease, is advantageous to efficient bicycle operation. When such lubricant is applied to the sprocket chain 3, prior to its entry into the cleaning canister housing 10 and no solvent is used, the air knifes 23 effectively blow away excess lubricant resulting in the desired thin coating. This thin coating of lubricant is less susceptible to picking up dust and dirt than a traditional thicker coating.

The use of the air knifes 23 to clear away excess lubricant minimizes the build-up of grime during bicycle operation when using many types of sprocket chain lubricants such as the hybrid lubricant disclosed by Reick (U.S. Pat. No. 4,333,840) and Teflon.

Finally, those skilled in the art will appreciate that the present invention can be applied to many types of vehicles that use various chain drives. For example, the present invention is particularly suitable for cleaning and lubricating motorcycle sprocket chains.

Industrial Applicability

To solve the aforementioned problems, the present invention is a unique system in which air knifes direct compressed air onto a bicycle chain immediately after it has been exposed to solvent.

Alternate Embodiments

Alternate embodiments may be devised without departing from the spirit or the scope of the invention. For example, the inventive device could be adapted to many types of sprocket chains including on motorcycles and other equipment.

What is claimed is:

1. A chain cleaner and lubrication apparatus for cleaning a sprocket chain while said sprocket chain remains operationally mounted on a vehicle, said apparatus comprising:
   (a) a housing for enclosing the sprocket chain on all sides, said housing consisting of mutually connectable upper half-shell and lower half-shell portions which, when connected, define a chain passageway for allowing the sprocket chain to pass through;
   (b) rollers mounted within the housing and adapted to suspend said housing from the sprocket chain;
   (c) an air knife adapted to direct high velocity air to impinge upon the sprocket chain;
   (d) a tubular hose connection on a first surface of the upper half-shell for allowing connection of a hose from a compressed air supply; and
   (e) an air tube communicating with said tubular hose connection and connected to each air knife;
   (f) wherein the upper half-shell portion further comprises a funnel shaped solvent hopper having a drainage opening adjacent the sprocket chain; and
   (g) wherein the lower half-shell portion further comprises a fluid collection region.

2. The apparatus of claim 1, further comprising:
   (a) additional air knifes, each adapted to direct high velocity air to impinge upon the sprocket chain.

3. The apparatus of claim 1, wherein the upper half-shell and lower half-shell portions are secured to one another using rubber bands affixed to axles that are associated with the rollers.

4. The apparatus of claim 3, wherein said axles are fabricated from stainless steel.

5. The apparatus of claim 1, wherein said sprocket chain is the sprocket chain of a bicycle.

6. The apparatus of claim 5 further comprising:
   (a) a securement assembly which includes a mounting plate adapted to attach to a rear wheel quick disconnect of the bicycle and a restraining cable; and
   (b) wherein said securement assembly is adapted to restrain the housing from collinear movement in response to a movement of the sprocket chain passing through said housing.

7. The apparatus of claim 1, wherein said sprocket chain is the sprocket chain of a motorcycle.

8. The apparatus of claim 1, further comprising:
   (a) a securement assembly,
      (i) said securement assembly connected at one end thereof to said housing, (ii) said securement assembly including means for readily attaching and detaching a distal portion thereof to a stable member of a vehicle, (iii) for securing said housing during use on said sprocket chain of the vehicle.

9. The apparatus of claim 1, wherein the chain passageway has a rectangular cross section which substantially matches the cross section of the sprocket chain.

10. The apparatus of claim 1 further comprising:
   (a) a cover adapted to fit on the solvent hopper and cover the same;
   (b) a siphon tube fluidly connected to accept solvent from the fluid collection region and to discharge said solvent into the funnel-shaped hopper region; and
   (c) a venturi adapted to accept high velocity air from the air tube and to thereby produce a vacuum to drive said solvent within the siphon tube.

11. The apparatus of claim 1, wherein said housing is manufactured from molded plastic.

12. The apparatus of claim 11, wherein said plastic is selected from the group consisting of: acetal resin, polyethylene, perfluoroalkoxy, polypropylene, and polyvinylidene fluoride.

13. A bicycle chain cleaner for cleaning a sprocket chain while said sprocket chain remains operationally mounted on the bicycle, said bicycle chain cleaner comprising:
   (a) a housing for enclosing the sprocket chain on all sides, said housing consisting of mutually connectable upper half-shell and lower half-shell portions which, when connected, define a chain passageway for allowing the sprocket chain to pass through, wherein
      (i) the chain passageway has a rectangular cross section which substantially matches the cross section of the sprocket chain and
      (ii) the upper half-shell and lower half-shell portions are secured to one another using rubber bands;
   (b) a securement assembly which comprises a mounting plate adapted to attach to a rear wheel quick disconnect of the bicycle and a cable,
      (i) wherein the securement assembly is adapted to restrain the housing from collinear movement in response to a movement of the sprocket chain passing through said housing;
   (c) wherein the lower half-shell further comprises
      (i) a fluid collection region; and
   (d) wherein the upper half-shell further comprises
      (i) rollers adapted to suspend the housing from the sprocket chain,
      (ii) a funnel shaped solvent hopper having a drainage opening adjacent the sprocket chain,
      (iii) a cover adapted to fit on the funnel shaped solvent hopper and cover the same,
      (iv) a tubular hose connection for allowing connection of a hose from a compressed air supply,
      (v) an air knife adapted to direct high velocity air to impinge upon the sprocket chain,
      (vi) a siphon tube fluidly connected from the fluid collection region to the funnel-shaped hopper region,
      (vii) a venturi adapted to accept high velocity air and to thereby produce a vacuum within the siphon tube, and
      (viii) an air tube communicating with said tubular hose connection and connected to the air knife and the venturi.

\* \* \* \* \*